US009900324B1

(12) United States Patent
Barua et al.

(10) Patent No.: US 9,900,324 B1
(45) Date of Patent: Feb. 20, 2018

(54) SYSTEM TO DISCOVER AND ANALYZE EVASIVE MALWARE

(71) Applicant: SecondWrite LLC, Bethesda, MD (US)

(72) Inventors: Rajeev Barua, Bethesda, MD (US); Kapil Anand, College Park, MD (US); Aparna Kotha, College Park, MD (US); Khaled Elwazeer, Silver Spring, MD (US)

(73) Assignee: SECONDWRITE LLC, Bethesda, MD (US)

( * ) Notice: Subject to any disclaimer, the term of this patent is extended or adjusted under 35 U.S.C. 154(b) by 77 days.

(21) Appl. No.: 14/609,382

(22) Filed: Jan. 29, 2015

Related U.S. Application Data

(60) Provisional application No. 61/932,876, filed on Jan. 29, 2014.

(51) Int. Cl.
*H04L 29/06* (2006.01)

(52) U.S. Cl.
CPC .................. *H04L 63/14* (2013.01)

(58) Field of Classification Search
CPC ... H04L 63/14; H04L 63/145; H04L 63/1433; H04L 63/1408; H04L 63/1416; G06F 21/125; G06F 21/53; G06F 21/54; G06F 21/563; G06F 21/566
USPC .................................................... 726/22–25
See application file for complete search history.

(56) References Cited

U.S. PATENT DOCUMENTS

| | | | | |
|---|---|---|---|---|
| 2008/0256517 | A1* | 10/2008 | Atkin | G06F 11/3688 717/124 |
| 2013/0091571 | A1* | 4/2013 | Lu | G06F 21/563 726/23 |
| 2013/0139264 | A1* | 5/2013 | Brinkley | G06F 21/566 726/24 |

OTHER PUBLICATIONS

Hira Agrawal, James Alberi, Lisa Bahler, William Conner, Josephine Micallef, and Alexandr Virodov, "Preventing Insider Malware Threats Using Program Analysis Techniques", Telcordia Technologies, 2010 Military Communications Conference-Unclassifed Program-Cyber Security and Network Management, p. 936-941.*
Anand et al.; A Compiler-level Intermediate Representation based Binary Analysis and Rewriting System; Proceedings of the $8^{th}$ ACM European Conf. on Computer Systems; 2013; p. 295-308.
Barua et al.; "Binary Rewriting System"; Provisional Patent Application; SecondWrite LLC; Jan. 2014; 21 pages.
"Understanding Bromium Micro-virtualization for Security Architects"; http://www.bromium.com.sites/default/Bromium-MicrovirtualizationfortheSecurityArchitect0.pdf; 2013; 8 pages.

(Continued)

*Primary Examiner* — Edward Zee
*Assistant Examiner* — Chi Nguy
(74) *Attorney, Agent, or Firm* — Baker & Hostetler LLP

(57) ABSTRACT

A method is presented for analyzing an original software program as a potentially evasive malware. The method may comprise discovering at least one revealed instruction in the original software program, where the revealed instructions are not executed when the original software program is run without modification; modifying the original software program to create a modified program that will execute at least one revealed instruction when the modified program is run; and exploring the at least one revealed instruction by running the modified program.

22 Claims, 5 Drawing Sheets

(56) References Cited

OTHER PUBLICATIONS

Bruening; "Efficient, Transparent, and Comprehensive Runtime Code Manipulation"; PhD Thesis; 2004; 306 pages.

Cadar et al; "EXE: Automatically Generating Inputs of Death"; Proceedings of the 13$^{th}$ ACM Conf. on Computer and Communications Security, CCS; 2006; p. 322-335.

Cadar et al.; "KLEE: Unassisted and Automatic Generation of High-Coverage Tests for Complex Systems Programs"; Proceedings of the 8$^{th}$ USENIX Conf. on Operating Systems and Designs and Implementations, OSDI; 2008; p. 209-224.

Srivastava et al.; "Vulcan: Binary transformation in a distributed environment"; Technical Report MSR-TR-2001-50; Microsoft Research; Apr. 2001; 11 pages.

Egele et al.; "A Survey on Automated Dynamic Malware-Analysis Techniques and Tools"; ACM Computing Surveys; vol. 44 No. 2; Feb. 2012; p. 6:1-6:41.

Enck et al.; "TaintDroid: An Information-Flow Tracking System for Realtime Privacy Monitoring on Smartphones"; Proceedings of the 9$^{th}$ USENIX Conf. on Operating Systems Design and Implementation, OSDI-10; 2010; 15 pages.

Eustace et al.; "ATOM: A Flexible Interface for Building High Performance Program Analysis Tools"; Proceedings of the USENIX Technical Conf.; 1995; 12 pages.

Laurenzano et al.; "PEBIL: Efficient Static Binary Instrumentation for Linus"; IEEE Int'l Symposium on Performance Analysis of Systems and Software (ISPASS); Mar. 2010; p. 175-183.

Luk et al.; "Pin: Building Customized Program Analysis Tools with Dynamic Instrumentation"; Proceedings of the 2005 ACM SIGPLAN Conf. on Programming Language Design and Implementation; 2005; p. 190-200.

Moser et al.; "Exploring Multiple Execution Paths for Malware Analysis"; Proceedings of the 2007 IEEE Symposium on Security and Privacy; 2007; 15 pages.

Nanda et al.; "BIRD: Binary Interpretation using Runtime Disassembly"; Proceedings of the Int'l Symposium on Code Generation and Optimization; 2006; 12 pages.

Nethercote et al.; "Valgrind: A Framework for Heavyweight Dynamic Binary Instrumentation"; SIGPLAN Not.; 2007; vol. 42 No. 6; p. 89-100.

Newsome et al.; "Dynamic Taint Analysis for Automatic Detection, Analysis, and Signature Generation of Exploits on Commodity Software"; Dept. of Electrical and Computer Engineering; Carnegie Institute of Technology; 2005; 18 pages.

Romer et al.; "Instrumentation and Optimization of Win32/Intel Executables Using Etch"; Proceedings of the USENIX Windows NT Workshop; Aug. 1997; 8 pages.

Schwarz et al.; "PLTO: A Link-Time Optimizer for the Intel IA-32 Architecture"; Proceeding Workshop on Binary Translation; 2001; 7 pages.

Sen; "Concolic Testing"; Proceedings of the twenty-second IEEE/ACM Int'l Conf. on Automated Software Engineering; 2007; p. 571-572.

Smithson et al.; "Static Binary Rewriting without Supplemental Information: Overcoming the Tradeoff between Coverage and Correctness"; IEEE 20$^{th}$ Working Conference; 2013; p. 52-61.

Yin et al.; Panorama: Capturing System-wide Information Flow for Malware Detection and Analysis: Proceedings of the 14$^{th}$ ACM Conf. on Computer and Communication Security; 2007; p. 116-127.

Buck et al.; "An API for Runtime Code Patching"; Performance Computing Applications; vol. 14 No. 4; 2000; p. 317-329.

\* cited by examiner

SYSTEM TO DISCOVER AND ANALYZE EVASIVE MALWARE

CROSS REFERENCE TO RELATED APPLICATIONS

This application claims benefit under 35 U.S.C. §119(e) of Provisional U.S. patent application No. 61/932,876, filed Jan. 29, 2014, the contents of which is incorporated herein by reference in its entirety.

GOVERNMENT RIGHTS

The subject matter disclosed herein was made with government support under National Science Foundation (NSF) SBIR Phase I Grant: #1315099, and National Science Foundation (NSF) SBIR Phase II Grant: #1430992. The government has certain rights in the herein disclosed subject matter.

TECHNICAL FIELD

This disclosure covers the area of computer science and detection of malicious software in particular.

BACKGROUND

Malicious software, also called malware, is software written with malicious intent, such as causing disruption, stealing information, money, or identities, or causing other harm without the consent of the owner or operator of the computer system. Malware are often analyzed and/or detected in sandbox-based solutions. A sandbox is a security mechanism for isolating a running software program, so it cannot harm the rest of the computer system. Example sandbox isolation mechanisms include limiting or emulating access to resources such as: disk and system memory, network access, access to other input or output devices, and host operating system services. Sandboxes are often implemented using virtualization technology. Where writes to system resources such as the file system are allowed, sandboxes often create a copy of the resource which is discarded when the sandbox completes operation, so that the underlying resource is not modified by malicious software. Some malware commonly referred to as evasive malware attempts to prevent detection of itself as malware. Malware can be evasive by, for example, exploiting the fact that sandboxes are often required to keep up with a constant stream of incoming network samples of potentially malicious software and thus can only run the software being analyzed for a few minutes before moving to other samples. Evasive malware can prevent suspicious behavior from being exposed or detected inside the sandbox by, for example, sleeping or doing harmless computations until the sandbox times out, or detecting the sandbox environment to shut down. Other examples of how malware evade sandbox detection are listed later in this document.

SUMMARY

This disclosure presents a method for analyzing an original software program as a potentially evasive malware, comprising: discovering at least one revealed instruction in the original software program, where the revealed instructions are not executed when the original software program is run without modification; modifying the original software program to create a modified program that will execute at least one revealed instruction when the modified program is run; and exploring the at least one revealed instruction or its behavior by running the modified program. The above method may include one or more of: modifying existing control transfer instructions, and inserting new control transfer instructions; and wherein the modified or new control transfer instructions cause control to be transferred to at least one revealed instruction.

The above method may further comprise: identifying one or more evasive code paths, where an evasive code path contains at least one revealed instruction; and selecting a subset of code paths to be explored from the plurality of evasive code paths.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Figure 1:
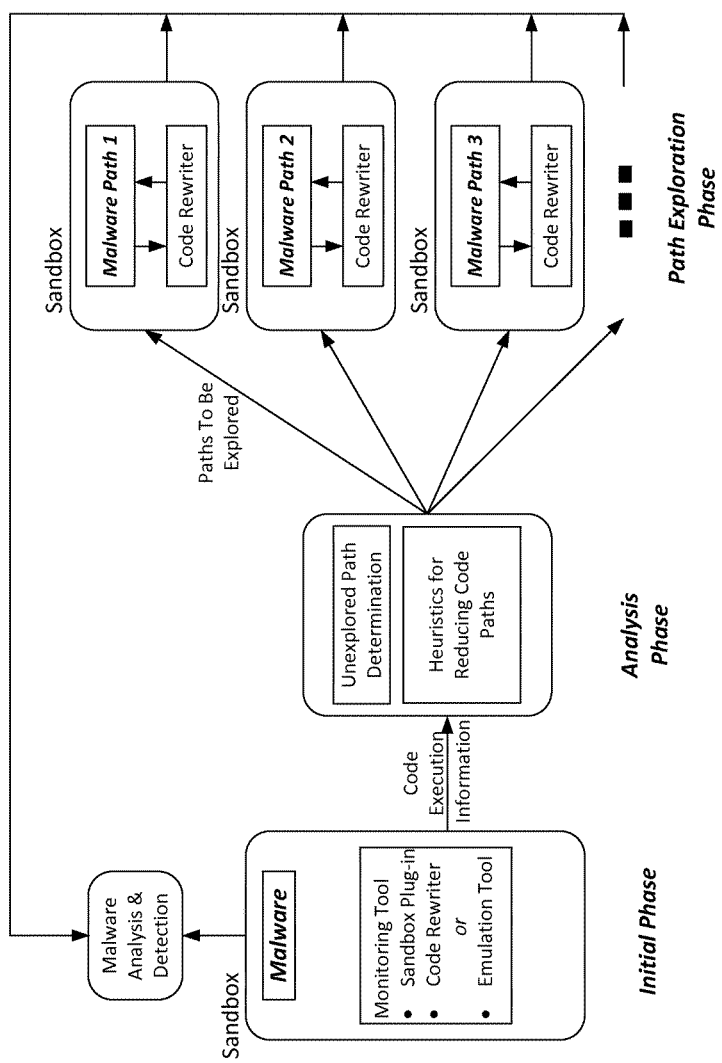
FIG. 1 depicts an exemplary multi-stage process for analysis of potential malware.

This disclosure describes methods for exposing the behavior of software that is potentially evasive malware. These methods can provide an efficient part of malware detection and analysis, especially as part of a dynamic malware execution platform such as sandboxing. A tool based on these methods monitors the execution of binary code to identify the portions of code that fail to run, and identify the corresponding program locations (conditional branches) where the decision to not run these portions is taken. The methods then create a copy of the current process or running program in a sandbox, for example by process cloning or by restarting execution from the beginning of the potential malware, and then modifying the outcome of above decision points in the copied process. Several copied processes may result from different not-taken paths in the initial execution of the potential malware. The original process continues the execution under the usual path while the copied processes force the program to run different portions of code that had never executed before. This exposes the behavior of the malware along all its program paths, defeating its evasion.

Malware writers are increasingly using sophisticated techniques, such as evading sandboxing tools, which further marginalizes the popular techniques of automated dynamic malware analysis. These evasive techniques enable malware to hide any malicious activity when executed in such an automated analysis environment. There are a variety of techniques which successfully evade the sandbox environment. For example, some evasive malware include a sleep call which instructs the malware to sleep for a while, resulting in a timeout of the sandboxed environment before any malicious activity is carried out. Malware writers employ several other techniques, such as executing useless code for a while, again, until the sandbox environment times out. Other evasive techniques based on checking conditions, include detecting the sandbox via a run-time check, checking that it is not yet a certain future date (where the current date is obtained, for example, from the system clock or a newspaper's website), or detecting the lack of user input (which is typical in sandboxes). In all of these cases, if the check succeeds, then the malware does not execute its malicious code, thus avoiding detection. Thereafter, the non-detected malware will be cleared to operate within the live system being protected since the one or more checks will either immediately or later fail, causing the malicious code to run and eventually infect the live system. In the above example, the sense of the check (success vs. failure) is for illustration only, and can be reversed by certain malware.

Examples of specific techniques that malwares use for evasion, grouped by type, include the ones below. This is not an exhaustive list; other evasive schemes exist to defeat malware detection and analysis schemes. Techniques relying on delay, causing the sandbox to time out, include:
1. Inserting sleep calls.
2. Inserting wait loops doing useless work.
3. Checking for particular time on system clock.
4. Checking for particular time on external Internet websites (for example, from newspaper websites).

Techniques relying on detecting sandboxes or human interaction, include:
5. Detect particular features of known sandboxes (for example, names of files).
6. Detect human interaction (for example, mouse clicks).
7. Detect human interaction intelligently (for example, mouse clicks at particular locations in a particular order).

Techniques targeting a particular network or computer, include:
8. Check for particular characteristics and only targeting them (for example, library version, user names, Internet protocol (IP) address, or installation name).

Some methods have been proposed to extend dynamic malware analysis for exploring multiple execution paths. However, these proposed methods still suffer severe practical limitations, including, but not limited to, high run-time and memory use overheads and the need to run too many paths through the malware. As a result, these methods are expensive and rarely used.

Another technique used by some platforms is to speed up the system clock to present the illusion to the malware that more time has passed than really has passed. However, this method is ad-hoc and not general. It can only defeat certain evasions of type 1 and 3 above, but not the rest.

Still other platforms simulate human interaction (for example, mouse clicks or cursor movement) in the sandbox, to make the malware think it is in a live system instead of a sandbox. However, this method too is ad-hoc and not general. It can defeat certain evasions of type 6 only, but not the rest.

Some previous approaches have employed techniques that do not run the program at all, either in a sandbox or otherwise. Instead they analyze the malware's code statically (that is, without running it.) For example, previous approaches have used methods devised by the program testing community to counter the challenges of evasive techniques. Program testing methods aim to explore as many program paths as possible automatically to discover bugs in an application. The program testing community has suggested exploring the use of advanced symbolic execution methods such as KLEE, EXE, and hybrid concolic (concrete-symbolic) execution to increase path coverage while identifying programming bugs in source code. Symbolic execution does not execute the code; instead it is a static analysis technique that reasons about run-time behavior without running the code. Having observed this similarity between evasive techniques and the automated bug discovery problem faced by the community of program testing, malware researchers have tried to extend the solutions proposed by program testing solutions to counter evasive techniques.

Such an approach of extending program testing methods directly for malware analysis has failed to achieve a practical malware analysis tool. The failure is primarily a result of the inherent limitations of such tools and the scale of malware samples. There are two features which limit the scalability of such automated bug discovery methods. The first problem is the use of a symbolic constraints solver to discover the feasibility of paths. These tools explore program paths by solving linear and non-linear constraints based on program input. Such constraint solving at each program control-flow location results in high performance overhead. A second problem is path explosion. For example, a loop inside a function with bounds of 100 is explored 100 times to guarantee the lack of bugs which might arise in any iteration. Similarly, a loop with symbolic bounds is explored until the symbolic constraints solver demonstrates the feasibility of a corresponding path. As a result, tools such as KLEE have reported performance slowdowns of 20-30 times and have been shown to scale to only small applications, for example of the size of 5000 lines of code. Such an overhead is unacceptable given the scale at which malware samples are being uncovered every day, and the lack of scalability makes analysis of larger malwares infeasible as well.

Embodiments of the present disclosure provide improvements to a computer itself by better identifying malware and thereby making the computer a safer platform for running other software. Malware can be better identified by, for example, identifying more potential malware, or more efficiently identifying potential malware, than other malware detection systems. By reducing the likelihood that malware exists on a particular computer system, or detecting malware more efficiently, the computer as a whole becomes a safer or faster platform on which to run any program.

Present embodiments include a light-weight (small and low overhead) path exploration solution for countering the challenge of evasive techniques in automated discovery of malware features. An inherent focus of the light-weight solution is exploring portions of code which have not been executed before. Once a particular code portion is executed, there is no need to explore that code through a different context. This approach simplifies code exploration in two ways. First, the number of paths to be explored becomes bounded to a small number—the number of non-executed code portions—that is linear in the size of the program, and usually much smaller. Second, symbolic constraints need not be employed to explore paths. Testing methods for benign programs may employ symbolic constraints to test the feasibility of a path. Such a method is required to ensure that only feasible paths are explored. Otherwise, such a tool might result in a large number of false positives due to impossible bugs in infeasible paths. However, a malware behavioral analysis tool need not be concerned with program crashes arising due to execution of a code portion under an incorrect context. A program path causing the malware to crash can be easily ignored, and the search for malicious behavior along other paths can continue without delay.

Code to be analyzed as potential malware is often in the form of binary code, but may be in another code format. Embodiments can be applied to code in any format—binary formats as well as other formats. Source code in programming languages such as C, or C++ can be translated by a compiler into binary code. Binary code is interchangeably referred to as machine code, native code or executable code, and is a representation of the program in just 1s and 0s, the fundamental building blocks of computer code, and is executed directly on computer hardware.

As will be described below, embodiments may include the ability to rewrite code. To do so, in the case of binary code, any binary rewriter may be used, though a dynamic binary rewriter may be preferable. Presently, there are mainly two classes of binary rewriters—static and dynamic. Example static binary rewriters include ETCH, PEBIL, SECONDWRITE, PLTO and ATOM. Example dynamic binary rewriters include RAPIDWRITE, DYNINST, VALGRIND, PIN, BIRD, DYNAMORIO and VULCAN by MICROSOFT. Dynamic rewriters may be more practical for analyzing evasive code given that they can execute packed and obfuscated malware. However, any binary rewriter, including a static rewriter, may be used. Code modification by rewriters can be done in-place, directly on a single copy of the code, or by modifying a copy of the code in a code cache.

If potential malware is not in the form of binary code, then methods described here can still be applied, provided some mechanism exists to rewrite the code. For example, for interpreted code, the interpreter often allows code to be modified or rewritten during execution. One interpreted code format is JAVA bytecode, which is executed in an interpreter called the JAVA Virtual Machine. Embodiments can be applied to such interpreters as well since they usually allow some mechanism to either rewrite the code or inject code into running applications.

One embodiment for analysis of potentially evasive malware works in three phases: the initial, analysis and path exploration phases. In the initial phase, the potential malware is run in a sandbox for a certain duration until it either completes or times out, and is run with some mechanism for monitoring. The monitoring may log what code is executed, and log all possible targets of conditional branch instructions. One way to achieve this monitoring is to modify the code using a code rewriter that inserts instrumentation to collect this information; however other mechanisms to collect the information needed can be used. A few such methods include using traces of instructions executed, or modifying the sandbox it is executing in to collect this information, or run the malware in an emulator. Then in the analysis phase, software may compute all the portions of the malware's code which were never executed in the initial phase. Finally in the path exploration phase, the potential malware is run in a sandbox, but this time a code rewriter is used to rewrite the malware to force it to execute along other paths that were never run during the initial phase. For each such possible path, the malware process may be duplicated. For example it may be cloned with OS-supported copy-on-write semantics which at run-time creates a copy of a portion of the code (usually a virtual memory page) just before a modification of that code portion is attempted, provided the code portion is previously unmodified, and then modifies the copy instead. Other mechanisms can be used. Multiple such cloned processes can be run to explore several paths.

FIG. 1 depicts an exemplary multi-stage process for analysis of potential malware. In some embodiments, the three phases above may not be run sequentially. Instead, as soon as the initial phase discovers a not-executed path, it may start its analysis and path exploration, without waiting for the initial phase to complete on all the code. However, waiting for the initial phase to complete reduces the number of paths that have never been executed, reducing the system's workload, at the cost of increasing the latency for the malicious behavior to be detected on the alternate paths. Moreover, one or more of the three phases depicted may be combined with other phases. The analysis phase may be eliminated in some embodiments as well since it may be simple and minimal.

Some embodiments may repeat the three phases recursively to discover evasive parts of the malware. This is helpful if hidden (not-taken) paths themselves contain other conditional branches that also hide other not-taken paths. This is called recursive evasion. Recursive embodiments can analyze all paths in recursively evasive malware by recursively repeating the all three phases until all not-taken branches are explored, a threshold is reached (such as a recursion depth count or a time limit), or some other termination condition is satisfied.

Reducing the Number of Paths

In building such a multi-path software evaluation tool, one challenge is to reduce computational complexity or system load. This can be done, for example, by limiting the number of paths. The number of paths in embodiments described above may be upper bounded by the number of never-executed-but-reachable branch targets in the code. This number is linear in the size of the code, and exponential context-sensitive path explosion does not happen in the embodiments described above. The number of such never-executed code targets will be small for most suspect malware, further limiting the number of paths.

Nevertheless, heuristics can be used to prioritize or reduce the amount of analysis. A time-limited or other resource-limited analysis can analyze highest priority code paths first, or not analyze lower priority code paths at all. This reduces the number of paths to be analyzed, reducing complexity needed to analyze potential malware. This frees compute resources that would otherwise be spent on analyzing potential malware, and makes those compute resources available for any other task on that computer, hence improving the computer itself.

One possible prioritization method is to analyze backward slices of targeted conditional branches to never-executed code. The backward slice of a source operand of the current instruction are the instructions executed immediately prior to a current instruction being executed that compute the current instruction's source operand in question. In embodiments, the source operand is the target of conditional branches that may jump to never-executed code. If these backward slices contain potentially evasive instructions, such as examination of external functions normally used for evasion, then those paths could be prioritized for exploration. External functions include a function call to instructions outside the suspect malware, for example a call to an operating system utility such as system time, user input, or checking of library version. Other testing paths may be designated as lower priority if the backward slice for a path does not contain suspect evasive instructions or external function calls. To reduce testing time or complexity, the lower priority paths may not be explored or run or further analyzed.

Taint flow analysis (also known as taint analysis) is another-method used in embodiments. Taint analysis is a method that determines what later values in a program may depend on the initial value read from an external source (the source of the taint.) The initial and later values thus identified are said to be "tainted". Taint analysis is used to develop a heuristic for prioritizing code paths that achieve results similar to analysis of backward slices. Suspect evasive instructions (i.e., those that may target non-executed code) may include instructions that read some environmental state of the computer, such as the presence of user inputs, library versions, IP addresses, or system time. The program variables that contain the result of these reads of environmental state are then marked as "tainted", meaning that they may depend on an environmental state that is often used for evasion. Then taint propagation is used; this is a technique that is part of taint analysis that propagates the taint values to all other program variables by using a set of rules. These rules, for example, mark a destination value of any instruction as tainted if any of the source values it is computed from are tainted. Finally, those conditional branches that use tainted values to compute their conditions are marked as potentially evasive, and their not-taken targets are given priority for exploration.

Additional priority can be given to never-executed paths at the exit of long-running loops, without examination of any slice or taint information. Such paths may have higher likelihood of following an evasive stalling loop.

Another prioritization heuristic is to check the number of dataflow relationships between code before a conditional branch instruction and instructions in code in a not-taken branch. A dataflow relationship exists between an instruction A and B if instruction A computes a value that is read by instruction B. If the number is high, then there is a greater chance that the code in the not-taken branch is not evasive code, and can be prioritized lower.

Separate from, or in addition to, prioritizing which code paths to analyze, system load or complexity can be reduced by shortening paths rather than reducing the number of paths. For example, if one cloned potential malware process re-joins a portion of the program executed earlier by the initial run or an earlier cloned malware process, then the later malware process could terminate, reducing the load on the system, at the cost of some accuracy. Embodiments may include a variety of such heuristics.

The methods above for reducing the number of paths to be analyzed or shortening the duration of a code path are not mutually exclusive. Multiple methods of prioritizing or shortening code paths can be employed simultaneously.

Handling Indirect Control Transfer Instructions (CTIs)

Indirect CTIs are CTIs with a target that is computed at run-time. They usually appear because of function pointers, jump tables, procedure returns, or position-independent code (PIC). "PIC" is a body of machine code that, being placed somewhere in the primary memory, executes properly regardless of its absolute address. In such cases, the methods described above will not reveal the target of the branch, since if the target address is not computed in any sandbox run, no jump will ever be made to it, and the code will not be run.

To overcome this limitation, program analysis methods (either static or dynamic or both) can be used to predict the set of possible targets of indirect CTIs, and then further analyze any or all of the possible targets in the set that were never executed in the initial run. Such program analysis methods could include general-purpose methods such as alias analysis methods, binary characterization, jump table recognition heuristics in binary code, or other methods that accomplish the same purpose. Alias analysis is a method which computes the set of possible values of a memory address (in this case an indirect CTI target). A type of alias analysis for binary code called value set analysis may also be used. Binary characterization is a method that searches for constants in the code segment of the binary code which also represent valid code addresses. The addresses represented by these constants are possible (although not guaranteed) entry points in the binary. In embodiments, they may also be candidate targets of indirect CTIs. Jump table recognition heuristics are methods that aim to discover jump tables in binary code. Jump tables are tables in the binary code that are often produced when compiling switch statements in source code. Addresses stored in discovered jump tables then become potential targets of indirect CTIs. Once discovered by any of the above methods, potential targets of indirect CTIs become potential starting points of evasive code sequences that embodiments consider for execution.

For some instances, using one of the above methods to overcome the problem of indirect CTIs is not necessary. If the malware has an indirect CTI that is not suspected to be evasive, all targets from that indirect CTI may be assigned a lower priority and hence not further analyzed. Conversely, an indirect CTI target that is computed based upon an evasive check may be given a higher priority for further analysis. For example, malware code may look as follows:

| 1. | if (some evasive check) | // evasive check |
|---|---|---|
| 2. | fp = &foo( ); | // foo is evasive code not seen in |
| | | //  the initial run |
| 3. | else | |
| 4. | fp = &bar( ); | // bar is non-evasive code seen in |
| | | //  initial run |
| 5. | call *fp | // indirect function call |

In the code above, the indirect CTI problem may be solved by the program analysis methods above for predicting the set of potential indirect CTI targets, without enhancements, when the run-time check on line 1 is forced to go to the not-taken path on line 2. In this case, the execution of line 2 in the path exploration phase of the embodiment will reveal that a possible value of fp is the address of procedure foo using dataflow analysis, a method for discovering dependences between instructions in programs. Thereafter, embodiments use the possible value of fp to identify the address of foo as a possible target of the indirect CTI in line 5. The program analysis methods described above for predicting the set of potential indirect CTI targets are not needed. Nevertheless they may be useful in other cases.

Handling the Modification of External Resources

Malware that modifies external resources can pose problems. When an analysis tool creates a clone process to explore a code path, memory may only be copied when needed, that is upon writes to non-external memory. Hence, if the taken and not-taken paths both modify a memory location, it is cloned in both paths, and everything works correctly. However, things may not work well without further modification when, during the path exploration phase, multiple executing paths modify external resources. External resources can include persistent files or network resources, such as sockets. For example, if both paths each write 10 words to a file, then when the process is closed in the later runs, if both are run in the same sandbox, the result will be a file with 20 words, or possibly an error condition when two parallel processes both try to simultaneously open a file for writing. Either way, this may be problematic if the malware analysis or detection method relies upon looking at the file output to characterize the malware. Similar problems are seen when a potential malware communicates with another entity via a network.

One solution to the external resources problem is to run each cloned process during the path exploration phase in its own sandbox, micro-sandbox, or other virtual environment. This is because in multiple virtual environments, each instance can maintain a separate copy of the file or other external resource separate from the other virtual environment instance. Other solutions that replicate the file for each path exploration separately are also possible.

Figure 2:
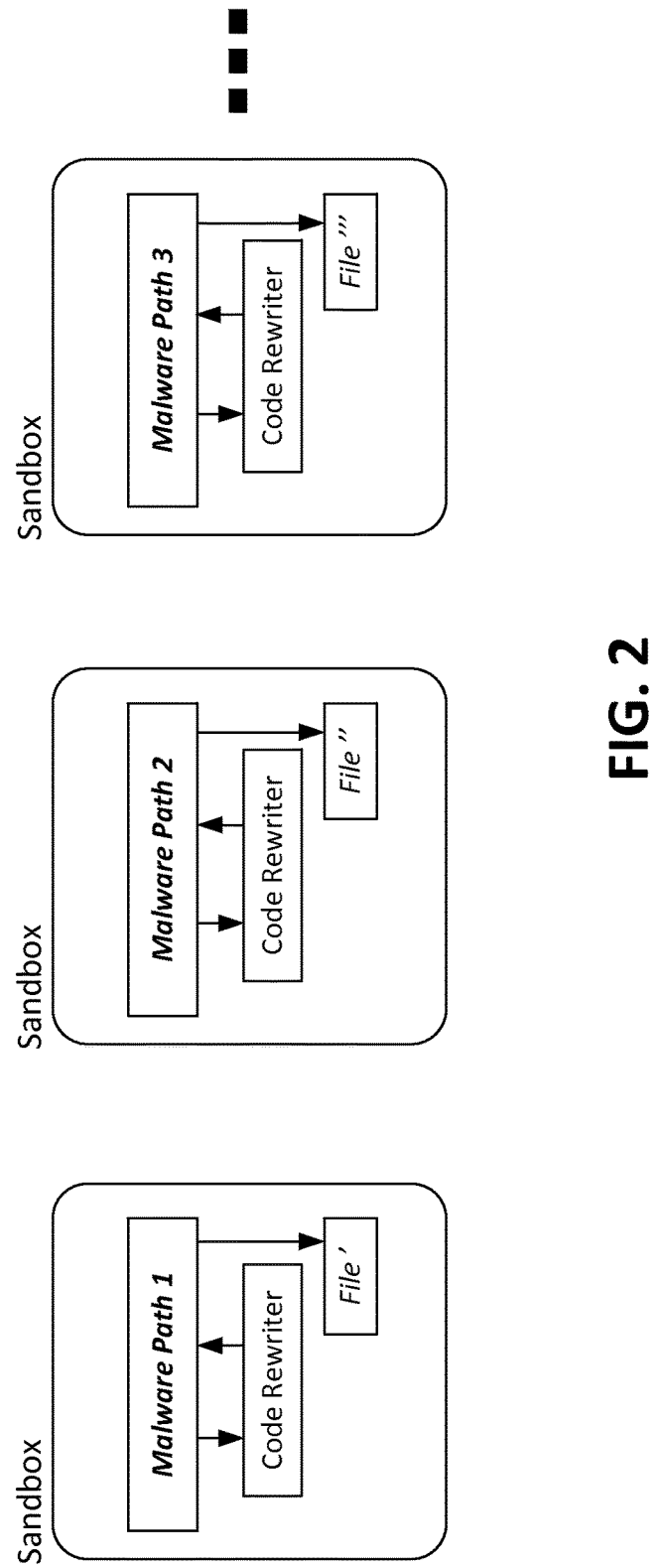
FIG. 2 depicts an option for access to external resources.

FIG. 2 depicts an option for access to external resources. In this option, each malware path is run in its own sandbox in the path exploration phase.

Figure 3:
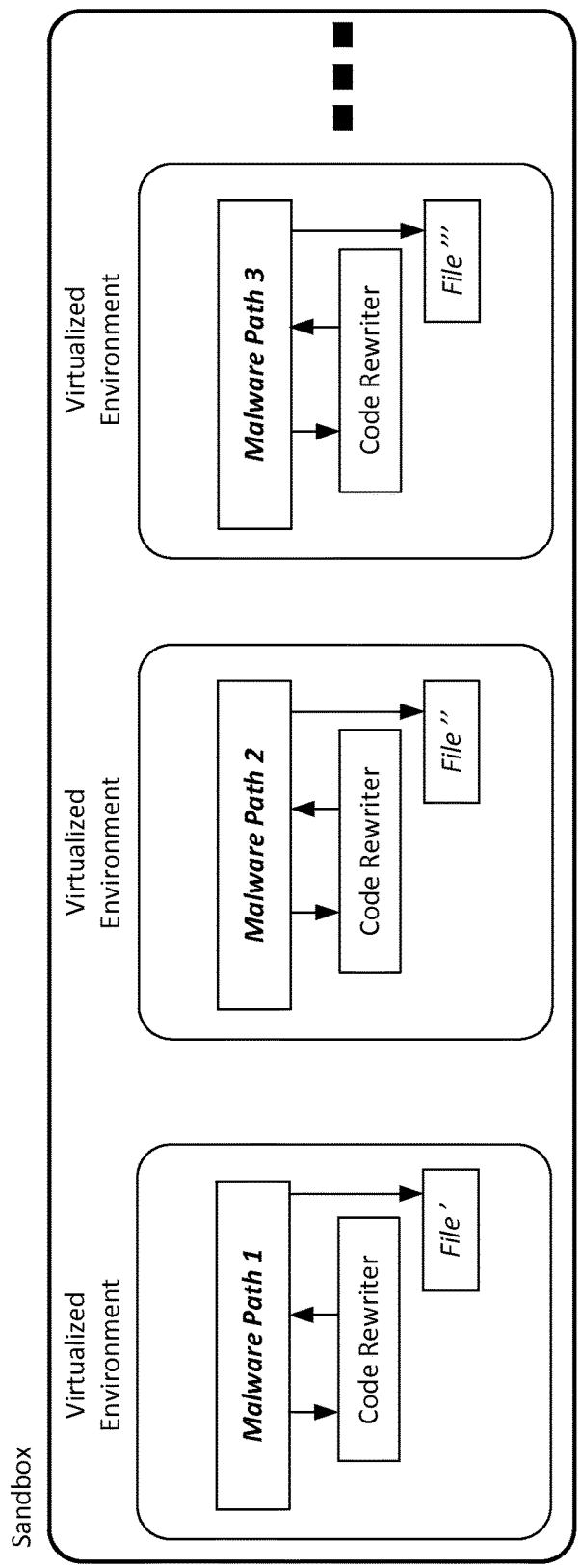
FIG. 3 depicts another option for access to external resources.

FIG. 3 depicts another option for access to external resources. In this option, each malware path is run in its own virtualized environment in the path exploration phase, but all the virtualized environments run in a single sandbox.

Network resources may be accessed from different paths in a malware. Both separate paths may be talking to an external server waiting for further instructions or sending it some data. Any such activity may be malicious and could leak information to the command & control server for the malware, or other network-visible site. One solution to this situation is to replicate the behavior of external servers and give the illusion to the malware that it is actually speaking to an external server. A separate such replicated external server could be used for each explored path of the malware.

Handling Incorrect Code Paths

Sometimes malware may not execute correctly when forced to execute along a not-taken path. This may reduce the chance of discovering malicious behavior in that path, but it generally does not affect the efficacy of embodiments nor does it adversely impact the computer system. This is because malware in a sandbox generally has no side effects outside it, and hence the offending malware path process with an error can simply be terminated along with its sandboxed contents.

Changing the Branch Direction Forever

There are two design choices when portions of code are executed that were not previously executed: (i) to change the branch direction entering this code portion in all the runs that follow or (ii) to change it back to its original direction after the new code path has been entered for the first time. Both these choices are valid.

Figure 4:
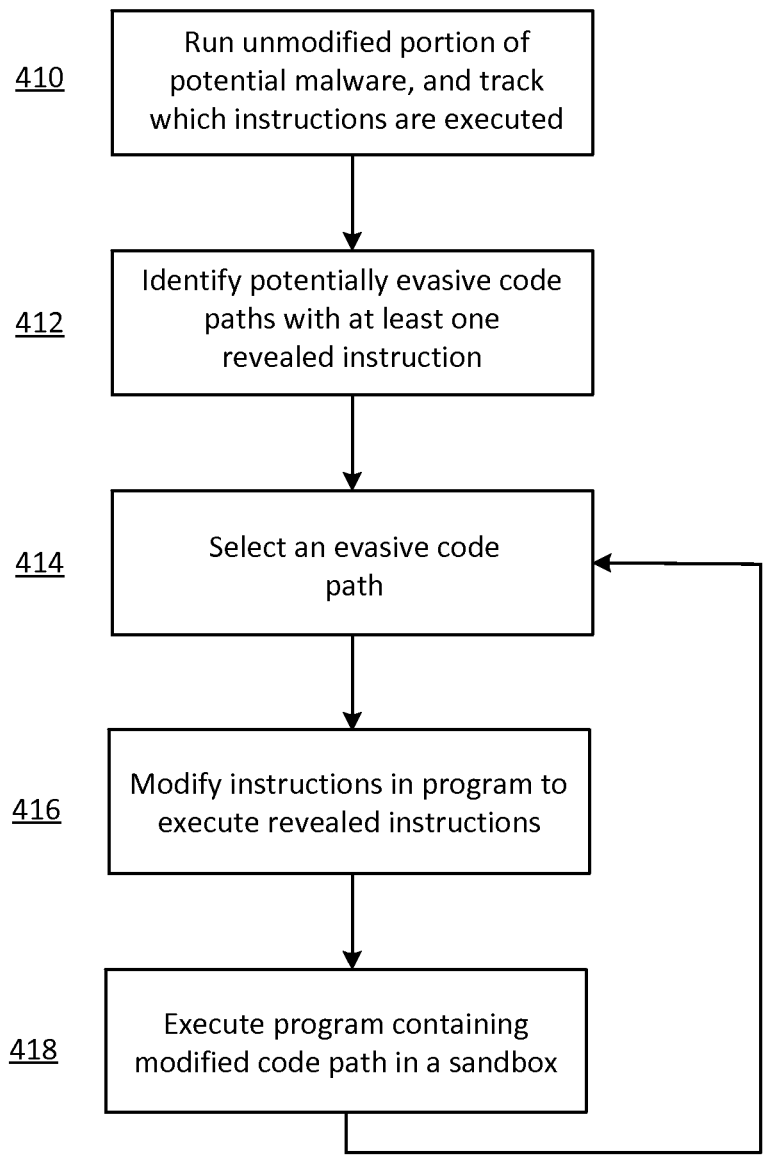
FIG. 4 is an exemplary flowchart for analysis of potential malware.

Turning now to the overall process, FIG. 4 is an exemplary flowchart for analysis of potential malware. The process starts with a software program, or portion thereof, that may contain malware. In step 410, the unmodified portion is run while tracking which instructions in the unmodified portion are actually executed and which are not. This is done by identifying the targets of conditional branches that are never taken, as described above. These never taken branch targets are identified in step 412 as the first revealed instructions in potentially evasive code paths. In step 414, one of the identified code paths may be selected based on priorities described above. In step 416, control transfer instructions are added to or modify the instructions in the system memory where the unmodified malware program is loaded to, or into a code cache if the embodiment uses a code cache, to cause the revealed (previously unexecuted) instructions to be executed the next time that code path is run. In step 418, the modified code path containing the added or modified control transfer instructions is run in a sandbox or other virtualized environment. Running the modified code path in step 418 will cause unmodified revealed instructions to be executed. Once step 418 is complete, with or without recursion, the next evasive path can again be selected in step 414 based on priorities described above. The entire procedure of FIG. 4 can optionally be recursively run by starting again at step 410 and making the unmodified revealed instructions in step 418 be the "unmodified portion of potential malware" in recursive step 410.

The present embodiment applies to systems with or without code caches. A code cache is a portion of memory separate from the memory image of the code segment of the binary executable program into which the binary rewriting software (if used) stores copies of instructions present in the code segment to execute. In a system without a code cache, the instrumentation is inserted into the original system memory image of the program code (binary or other type of code). In contrast, in a system with a code cache, the instrumentation is inserted into the copy of the code in the code cache.

Figure 5:
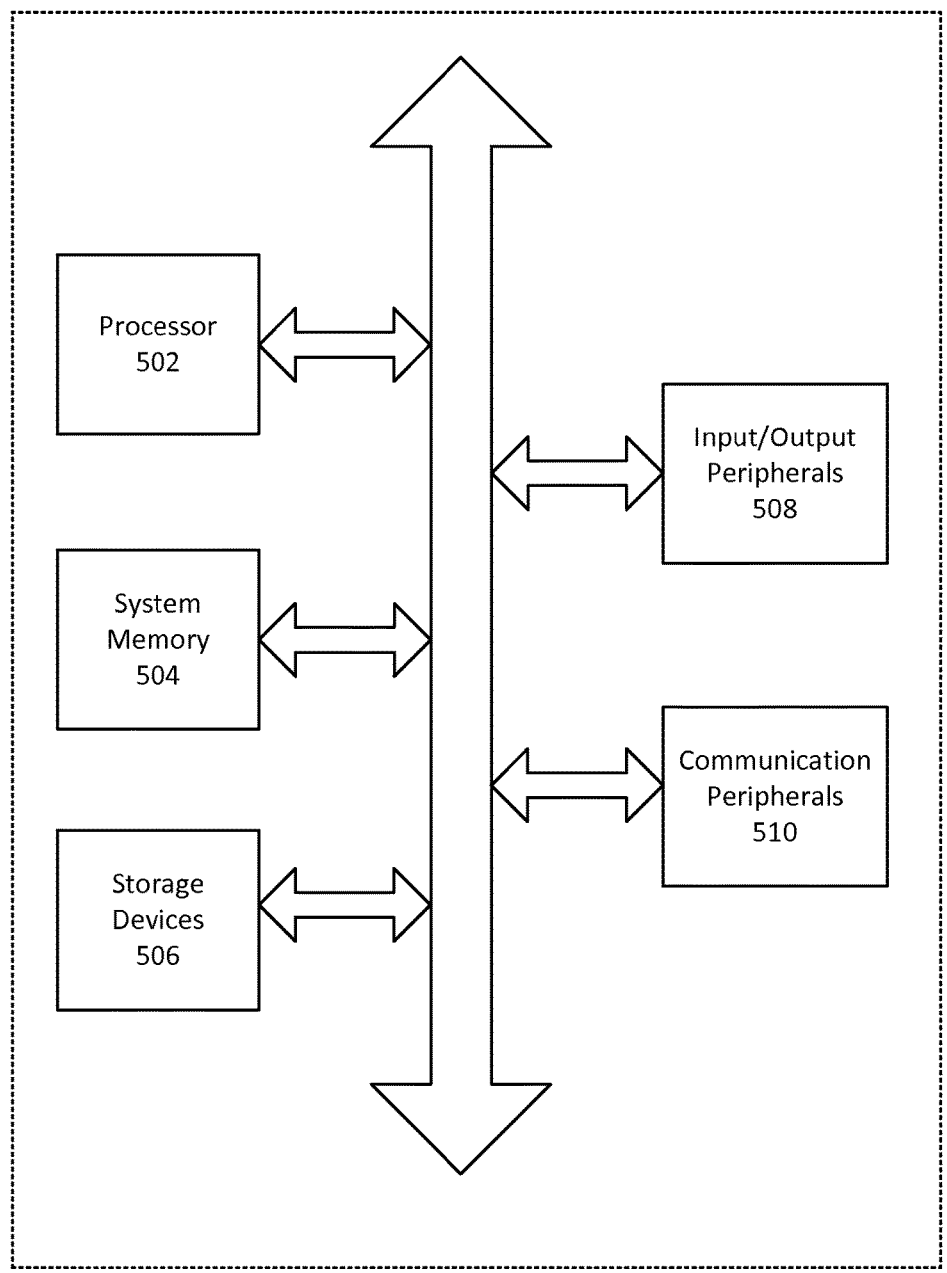
FIG. 5 depicts an exemplary general computing system.

FIG. 5 depicts a general computing system 500. As described above, the operations associated with a hybrid binary rewriter may be implemented on a wide variety of computing environments similar to computing system 500, such as commodity-hardware computers, virtual machines, computing clusters and computing appliances, and cloud computing. Any of these computing devices or environments may be referred to as computing nodes or systems.

In a basic configuration, the computing device may include at least a processor 502, a system memory 504, storage devices 506, input/output peripherals 508, communication peripherals 510, and an interface bus connecting these various components. The interface bus may be configured to communicate, transmit, and transfer data, controls, and commands between the various components of the computing device. The system memory and the storage device comprise computer readable storage media, such as RAM, ROM, EEPROM, hard-drives, CD-ROMs, optical storage devices, magnetic storage devices, flash memory, and other tangible storage media. Any of such computer readable storage medium can be configured to store instructions or program codes embodying aspects of the disclosure. Additionally, the system memory comprises an operation system and applications. The processor is configured to execute the stored instructions and can comprise, for example, a logical processing unit, a microprocessor, a digital signal processor, and the like.

The input/output peripherals 508 include user interfaces, such as a keyboard, screen, microphone, speaker, touch-screen interface, other input/output devices, and computing components—such as digital-to-analog and analog-to-digital converters, graphical processing units, serial ports, parallel ports, universal serial bus, transmitter, receiver, etc. The input/output peripherals 508 may be connected to the processor through any of the ports coupled to the interface bus.

Finally, the communication peripherals 510 of the computing device are configured to facilitate communication between the computing device and other computing devices (e.g., between the computing device and the server) over a communications network. The communication peripherals include, for example, a network interface controller, modem, various modulators/demodulators and encoders/decoders, wireless and wired interface cards, antenna, etc.

The communication network includes a network of any type that is suitable for providing communications between the computing device and the server, and may comprise a combination of discrete networks, which may use different technologies. For example, the communications network includes a cellular network, a Wi-Fi/broadband network, a local area network (LAN), a wide area network (WAN), a telephony network, a fiber-optic network, or combinations thereof. In an example embodiment, the communication network includes the Internet and any networks adapted to communicate with the Internet. The communications network may also be configured as a means for transmitting data between the computing device and the server.

By way of example, processor 502 may execute instructions from system memory 504 that analyze a potential malware, such as instruction that implement the method of FIG. 4. The potential malware may originally be stored in storage device 506, copied to system memory 504 to be run on the processor 502, and additional code cache copies of the potential malware may also be made in system memory 504. Alternately, while instructions to analyze a potential malware may be run directly on processor 502, the potential malware itself may be run in a virtualized environment and not directly run by processor 502.

The techniques described above may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps, including creation of or changes to a billing services account, may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be exorcised from the combination, and the claimed combination may be directed to a subcombination or a variation of a subcombination.

What is claimed:

1. A method for analyzing at least instructions of an original software program as a potentially evasive malware, comprising:
running the original software program without modifying the original software program and with monitoring execution of the original software program;
identifying each possible target of a conditional branch instruction of the original software program that executed during running of the original software program, wherein each possible target includes both a taken target and a not-taken target;
identifying a revealed instruction of the original software program that did not execute when the original software program was running, the revealed instruction being located in a code path starting at a possible target;
modifying one or more instructions of the original software program to create a modified program, without modifying the at least one revealed instruction, the one or more modified instructions causing the at least one revealed instruction to execute when the modified program is run;
running the modified program and monitoring execution of the modified program; and
exploring possible new behavior monitored during running the modified program.

2. The method of claim 1, wherein modifying includes one or more of:
modifying existing control transfer instructions, and inserting new control transfer instructions; and
wherein the modified control transfer instructions or the new control transfer instructions cause control to be transferred to the at least one revealed instruction.

3. The method of claim 1, additionally comprising:
creating a copy of at least a portion of the original software program in a code cache; and wherein modifying includes modifying the copy in the code cache.

4. The method of claim 1, wherein the modifying step is an in-place modification of the original software program.

5. The method of claim 1, wherein identifying a revealed instruction includes identifying a plurality of potentially evasive code paths, where a potentially evasive code path among the plurality of potentially evasive code paths contains the revealed instruction; and
selecting a subset of code paths to be explored from the plurality of potentially evasive code paths.

6. The method of claim 5, wherein the subset of code paths are selected by prioritizing the plurality of potentially evasive code paths with one or more of analyzing backward slices, taint flow analysis, identifying never-executed paths following long-running loops, and analyzing dataflow relationships around a branch instruction.

7. The method of claim 1, wherein running the original software program and running the modified program occur in a sandbox or other virtualized environment.

8. The method of claim 1, wherein the original software program is one of: a binary executable, and interpreted code.

9. The method of claim 1, wherein the possible new behavior is based on the code path in which the revealed instruction is located, and further comprising:
identifying the original software program as evasive malware based on the possible new behavior.

10. The method of claim 1, further comprising identifying each possible target of an indirect branch instruction that executed during running the original software program.

11. The method of claim 1, wherein either or both of the taken target and the not-taken target contain malicious code.

12. A non-transitory computer readable medium comprising instructions for analyzing at least instructions of an original software program, the medium comprising instructions that, when executed on the computer, cause the computer to at least:

run the original software program without modifying the original software program and with monitoring execution of the original software program;

identify each possible target of a conditional branch instruction of the original software program that executed during the run of the original software program, wherein each possible target includes both a taken target and a not-taken target;

identify a revealed instruction of the original software program that did not execute when the original software program was running, the revealed instruction being located in a code path starting at a possible target;

modify one or more instructions of the original software program to create a modified program, without modifying the at least one revealed instruction, the one or more modified instructions causing the at least one revealed instruction to execute when the modified program is run;

run the modified program and monitor execution of the modified program; and explore possible new behavior monitored during the run of the modified program.

13. The non-transitory computer readable medium of claim 12, wherein the instructions to modify include instructions to one or more of:

modify existing control transfer instructions, and insert new control transfer instructions; and wherein the modified control transfer instructions or the new control transfer instructions cause control to be transferred to the at least one revealed instruction.

14. The non-transitory computer readable medium of claim 12, wherein the instructions further cause the computer to create a copy of at least a portion of the original software program in a code cache; and wherein the instructions to modify the copy in the code cache.

15. The non-transitory computer readable medium of claim 12, wherein the instructions to modify are modified in-place of the original software program.

16. The non-transitory computer readable medium of claim 12, wherein the instructions to identify a revealed instruction further cause the computer to:

identify a plurality of potentially evasive code paths, wherein a potentially evasive code path among the plurality of potentially evasive code paths contains the revealed instruction; and select a subset of code paths to be explored from the plurality of potentially evasive code paths.

17. The non-transitory computer readable medium of claim 16, wherein the subset of code paths are selected by prioritizing the plurality of potentially evasive code paths with one or more of: analyzing backward slices, taint flow analysis, identifying never executed paths following long-running loops, and analyzing dataflow relationships around a branch instruction.

18. The non-transitory computer readable medium of claim 12, wherein the instructions further cause the computer to: run the original software program and run the modified program in a sandbox or other virtualized environment.

19. The non-transitory computer readable medium of claim 12, wherein the original software program is one of: a binary executable, and interpreted code.

20. The non-transitory computer readable medium of claim 12, wherein the possible new behavior is based on the code path in which the revealed instruction is located, and wherein the instructions further cause the computer to:

identify the original software program as evasive malware based on the possible new behavior.

21. The non-transitory computer readable medium of claim 12, wherein the instructions further cause the computer to identify each possible target of an indirect branch instruction that executed during the run of the original software program.

22. The non-transitory computer readable medium of claim 12, wherein either or both of the taken target and the not-taken target contain malicious code.

* * * * *